UNITED STATES PATENT OFFICE.

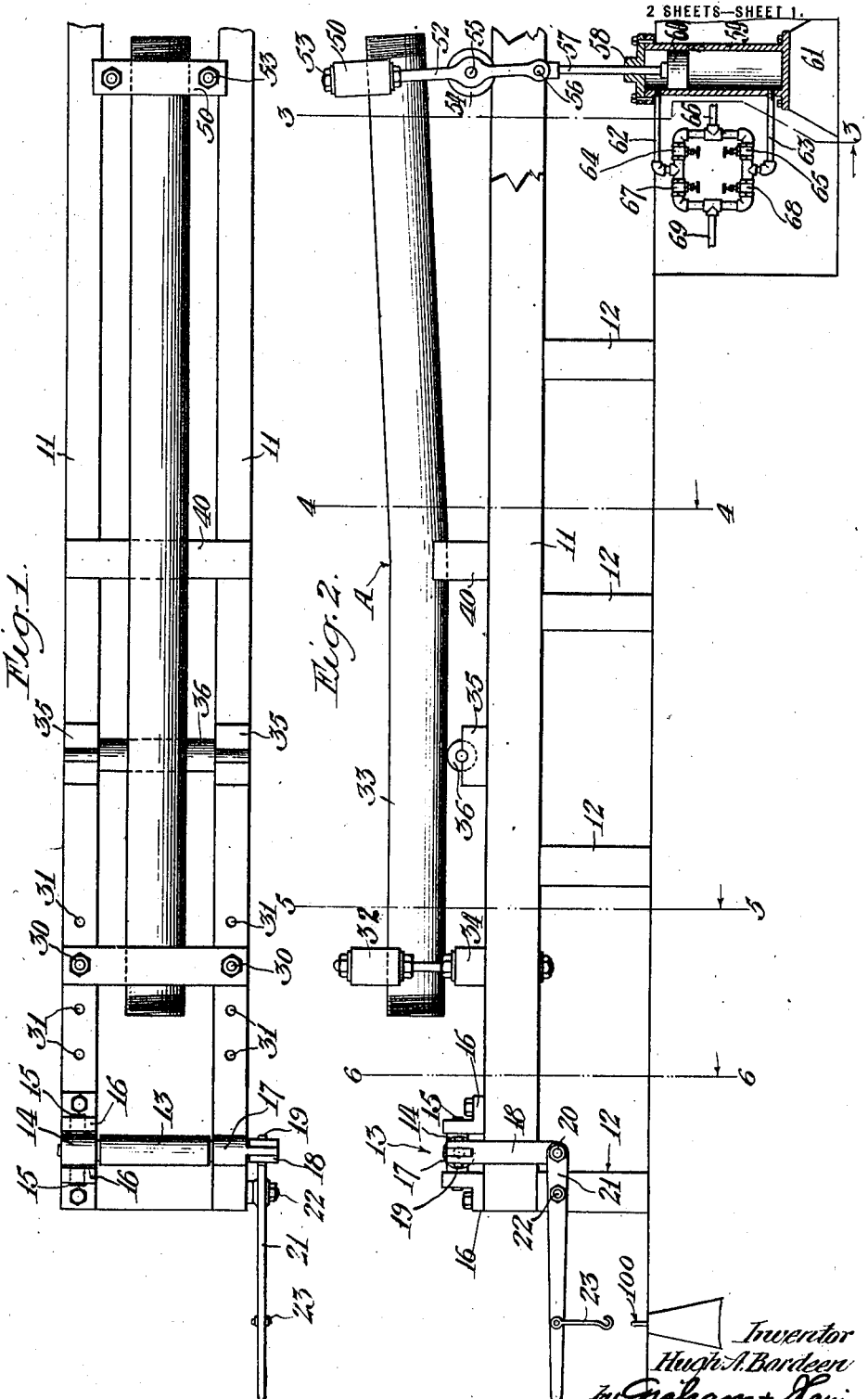

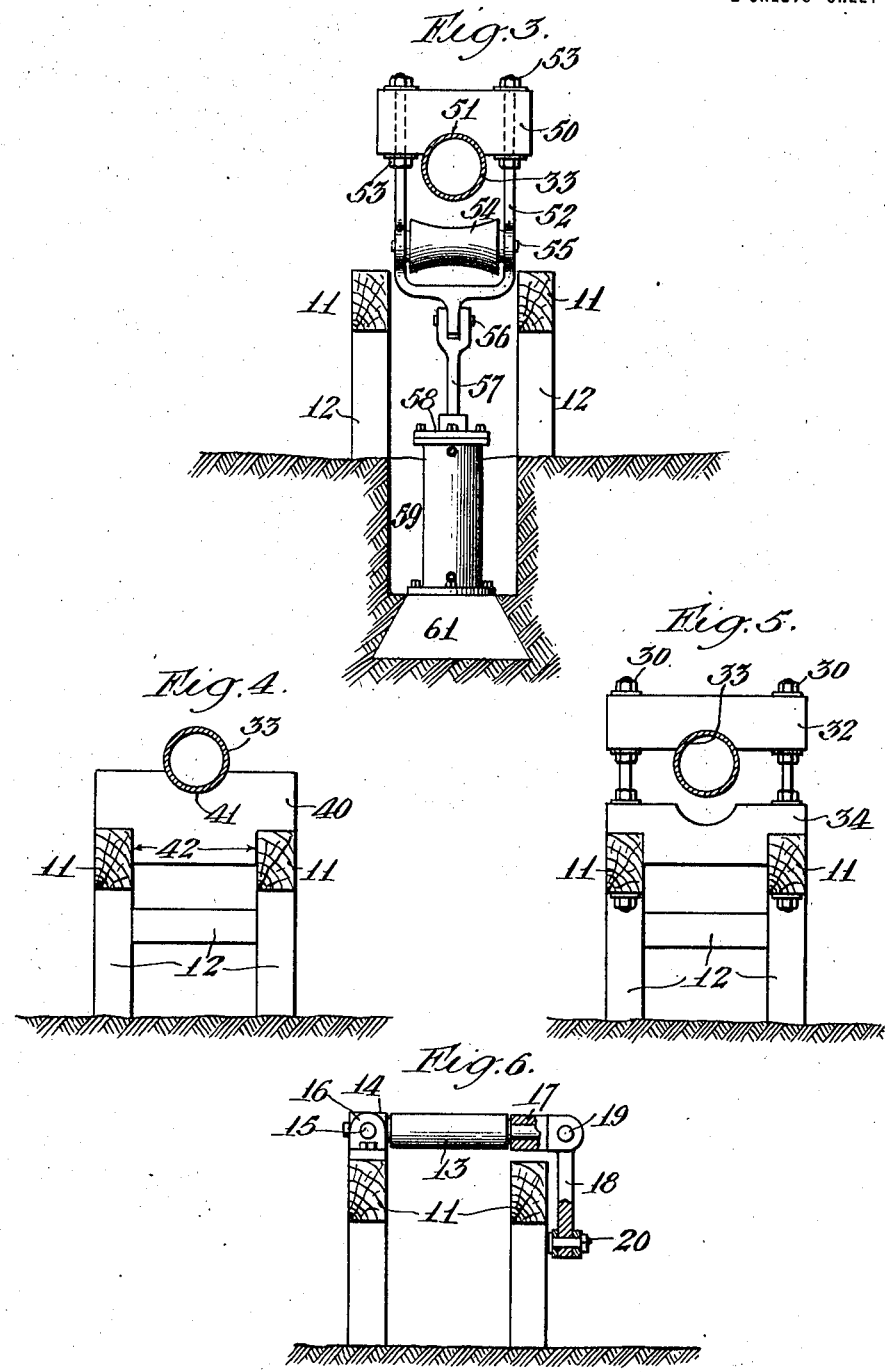

HUGH A. BARDEEN, OF LOS ANGELES, CALIFORNIA.

PIPE-STRAIGHTENING DEVICE.

1,290,047.     Specification of Letters Patent.     Patented Jan. 7, 1919.

Application filed November 12, 1917. Serial No. 201,855.

*To all whom it may concern:*

Be it known that I, HUGH A. BARDEEN, a citizen of the United States, residing at Los Angeles, in the county of Los Angeles and State of California, have invented a new and useful Pipe-Straightening Device, of which the following is a specification.

My invention relates to the art of reconstructing and renewing second-hand pipe. In this art such pipe is first treated with heat to reconstruct its molecular structure and is then straightened so that it can again be used.

The invention consists in the novel construction and arrangement of parts as shown in the drawings, described in the specification, and specified in the claim.

Various objects and advantages will be disclosed hereinafter.

Referring to the drawings which are for illustrative purposes only,

Figure 1 is a plan view of one embodiment of my invention.

Fig. 2 is a side view partly in section of the apparatus shown in Fig. 1.

Fig. 3 is a section on a plane represented by the line 3—3 of Fig. 2, this plane being viewed in the direction of the arrows.

Fig. 4 is a section on a plane represented by the line 4—4, Fig. 2, this plane being viewed in the direction of the arrows and certain parts beyond the immediate foreground being omitted for the purpose of clearness.

Fig. 5 is a section on a plane represented by the line 5—5 of Fig. 2, certain of the parts beyond the immediate foreground being omitted for the purpose of better illustrating the invention.

Fig. 6 is a section on a plane represented by the line 6—6 of Fig. 2, this section being viewed in the direction of the arrows.

As illustrated in these drawings, the invention consists of a pair of ways 11 supported on suitable structure 12. Secured on one end of the ways 11 is an initial roller 13, this roller being provided with a bearing 14 turning on trunnions 15 secured to fixed bearings 16 and being provided at the other end with a bearing 17 carried on a link 18 and pivoted thereto on a pin 19. The link 18 is secured by means of a pin 20 on a lever 21 which is pivoted at 22 on the structure 12. A hook 23 or other convenient means is provided by which the lever 21 may be secured if desired.

Secured by means of bolts 30, passing through various holes 31 in the ways 11, is a primary block 32 which is shaped to fit around the pipe 33 to be straightened, and which is provided with a coöperating lower block 34. Mounted in open top bearings 35 is a secondary roller 36 which may be readily removed if desired. Freely adjustable on the ways 11 is a secondary block 40, this block being cut away as shown at 41 in Fig. 4 to fit under the pipe 33 and being shaped as shown at 42 to fit inside the ways 11 so as to be held in proper relationship therewith. A tertiary block 50 is provided, cut away as shown at 51 in Fig. 3, to fit over the top of the pipe 33. A tension member 52 is secured by means of nuts 53 in the tertiary block 50 and carries a roller 54 turning on a suitable shaft 55.

Pivoted on a pin 56 in the member 52 is a piston rod 57, this rod passing through the cover 58 of a cylinder 59 and being provided with a piston 60 fitting tightly inside the cylinder 59. The cylinder 59 is securely fastened to a heavy masonry or concrete block 61. Pipes 62 and 63 connect into the top and bottom of the cylinder 59 at either end thereof and are each connected through valves 64 and 65 respectively with a pressure pipe 66, being connected through valves 67 and 68 with an exhaust pipe 69. The parts 57 to 69 form what is generally known as a hydraulic jack, the term jack as used in the claim including not only such a jack but also any equivalent mechanical device for exerting pressure.

The method of operation of the invention is as follows:

The pipe 33 which is to be straightened is supposed to have a sharp bend as shown at "A" in Fig. 2. The roller 13 being held in its upper position due to the fact that the lever 21 is depressed and the hook 23 is secured in the eye 100 shown in Fig. 2, the pipe can be readily rolled into place on the rollers 13 and the rollers 36. The block 40 is then adjusted along the ways 11 so that the bend "A" rests thereon as best shown in Fig. 2 the end of the pipe being held down by the primary block 32. At the same time the tertiary block 50 is placed over the top of the pipe and the valves 64 and 68 are opened. Water under pressure is supplied through the pipe 66 flowing through the pipe 62 in the top of the cylinder 59 and forcing the tertiary block 50 downward thereby bending the pipe until it is straight at the bend at "A". The piston 60 can be returned to its upper position at any time by closing the valves 64 and 68 and opening the valves 65 and 67. If a double ended outfit is provided the operation is considerably facilitated as the lever room between the secondary block 40 and the tertiary block 50 can thereby be made greater at all times than the distance between the secondary block 40 and the primary block 32 without the necessity for reversing the position of the pipe with relation to the ways 11.

What I claim is:

A pipe straightening device comprising a pair of parallel ways; a structure supporting said ways; a primary block having its lower surface shaped to fit around the pipe to be straightened, said primary block extending above and across said ways; a pair of bolts each passing through one end of said primary block and through said ways; a secondary block having its upper surface shaped to fit around the pipe to be straightened, said secondary block resting upon and freely movable along said ways; a tertiary block having its lower surface shaped to fit around the pipe to be straightened; a tension member secured to said tertiary block and projecting downwardly between said ways; and a jack suitably anchored below said ways and connected to pull downwardly on said tension member.

In testimony whereof, I have hereunto set my hand at Los Angeles, California, this 6th day of November, 1917.

HUGH A. BARDEEN.